United States Patent [19]
Bates et al.

[11] 3,824,603
[45] July 16, 1974

[54] SOLENOID ACTUATED RECORDING APPARATUS

[75] Inventors: Roy G. Bates; William R. Dahl, both of Littleton, Colo.

[73] Assignee: Honeywell Inc., Minneapolis, Minn.

[22] Filed: Dec. 18, 1972

[21] Appl. No.: 316,341

[52] U.S. Cl. .............. 346/141, 346/139 B, 346/140
[51] Int. Cl. .......................................... G01d 15/24
[58] Field of Search ................. 346/139 B, 141, 140

[56] References Cited
UNITED STATES PATENTS

| | | | |
|---|---|---|---|
| 2,566,546 | 9/1951 | Barnes et al. | 346/139 R |
| 2,655,426 | 10/1953 | Barnes | 346/68 X |
| 3,383,702 | 5/1968 | Donahue | 346/140 |
| 3,584,575 | 6/1971 | Distl | 101/109 |
| 3,673,604 | 6/1972 | Gordon | 346/139 B |
| 3,686,681 | 8/1972 | Stegenga | 346/141 |

*Primary Examiner*—Joseph W. Hartary
*Attorney, Agent, or Firm*—Arthur H. Swanson; Lockwood D. Burton; John Shaw Stevenson

[57] ABSTRACT

An X-Y recorder carrier supports a stylus and solenoid which are uniquely linked to provide movement of a stylus on to a chart thereby to avoid inertial effects of the solenoid on the stylus in the selective actuation by the solenoid of the stylus into and out of chart engagement. Electrical power for the solenoid is transmitted to the solenoid by the carrier drive cables and associated pulleys.

2 Claims, 4 Drawing Figures

PATENTED JUL 16 1974 3,824,603

SOLENOID ACTUATED RECORDING APPARATUS

FIELD OF THE INVENTION

Applicants invention is for an improved solenoid actuating mechanism for Recorders of the type generally classified in the United States Patent Office in Class 346 Recorders, Subclass 139, Markers and/or Driving Means therefor.

BACKGROUND OF THE INVENTION

Pen carriers which have heretofore been employed in XYY recorders that contain solenoid actuated pens which require a direct mechanical connection between the core of the solenoid that is generally mounted as a separate unit on top of the pen carrier and its associated pen to lift off of and drop this pen onto a chart. These solenoids have used separate flexible electrical cables to receive power from an electrical power source as the pen carriage of these recorders is moved across a chart.

Because the core of the aforementioned prior art solenoids move jointly with the pen as it is lowered onto the chart and lifted therefrom the inertial effects which the shifting mass of this core exerts will slow down the time that is required for a pen to be lifted and lowered into contact with the chart. The weight and inertia of these solenoids also cause the pen point to be applied to the writing surface of the chart with an undesired amount of force, which has a tendency to wear out the pen point and to widen the line being inscribed on the chart.

The use of a flexible cable extending across the chart from a power source have therefore added extra parts which parts have a tendency to place a drag on the pen carrier as it moves across the chart.

SUMMARY OF THE INVENTION

In accordance with applicant's invention there is provided an improved solenoid actuated mechanism mounted within a recess in a pen carrier for selectively lowering a pen or other stylus into recording engagement with a chart or other surface on which a record is to be made, and for raising the stylus out of chart engagement. The mechanism is also provided with an electric cable and pulley means operably positioned on said carrier to provide a means for transmitting a current from a power supply source to operate the solenoid and to simultaneously effect movement of the pen carrier across the chart. The improved solenoid actuated mechanism includes a solenoid mounted inside a recess or cavity formed in the pen carriage and a spring biasing means in another recess or cavity formed in the carriage to enable the pen actuating arm extending from the core of the solenoid to be disconnected from the pen before the pen is lowered from a lifted position into engagement with a chart.

The aforementioned unnecessary pen carrier cable drag problem is overcome, as shown by the construction of the recording apparatus disclosed herein, by making the pulley and cables which are employed to move the pen carrier across the chart of an electrically conductive material so that they can be used to also transmit a current from a power source to the solenoid without introducing the detrimental drag effects on the pen carrier that occurs in prior art pen carriage drives that employ separate electric power transmitting cables to do this job.

BRIEF DESCRIPTION OF DRAWING

A better understanding of the present invention may be had from the following description when read in connection with the accompanying drawing in which.

DESCRIPTION OF THE PREFERRED EMBODIMENT

Figure 4:
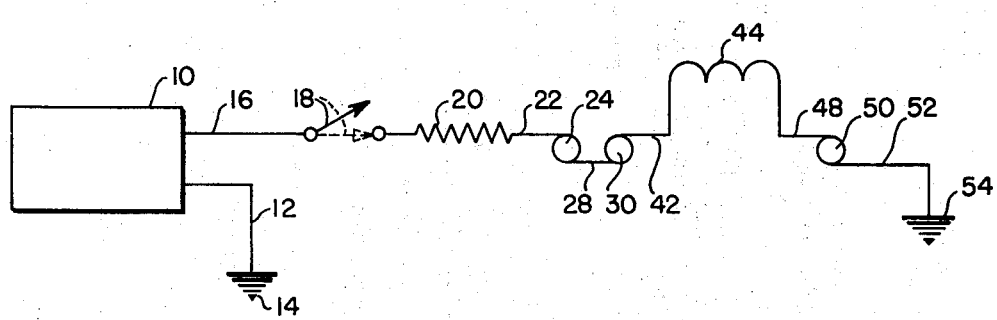
FIG. 4 shows how the pen carrier cables provide an electrical circuit for transmitting current to the solenoid which is shown on FIGS. 1 and 2.

One side of a D.C. power supply 10 as shown in FIG. 4 is provided with an electric conductor 12 having a ground connection 14. The other side of the power supply 10 is provided with electrical conducting wire 16 that is connected to a switch 18. When the switch 18 is closed a current flows from the D.C. power supply through the conductor 16, switch 18, a resistor 20 and by way of an electrical conductor 22 to an electrically conductive pen carrier drive pulley 24 that is located at one side of the chart 26 which is shown in FIGS. 1 and 2.

Figures 1, 2:
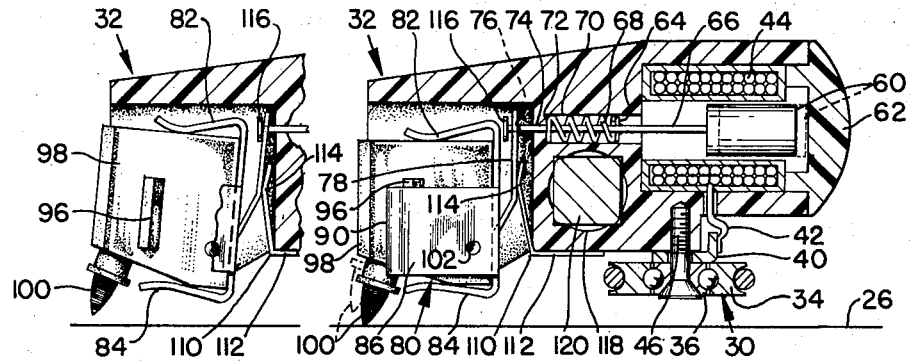
FIG. 1 is a cross sectional view of the recording apparatus.
FIG. 2 is a view of the recording apparatus with the pen and pen holder shown in a lifted off chart position.
Figure 3:
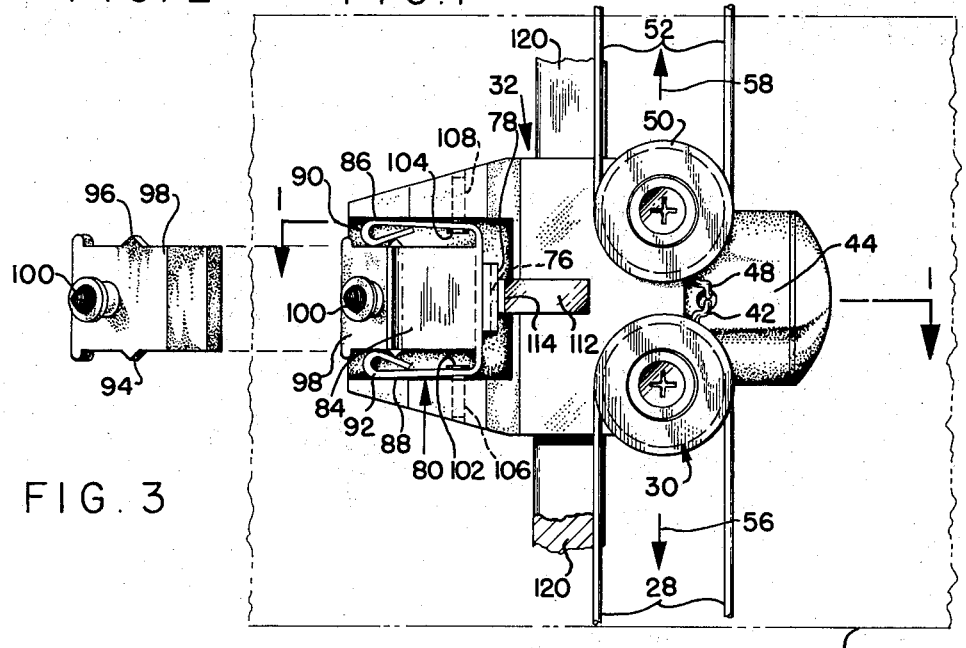
FIG. 3 is a view looking at the base of the recording apparatus shown in FIG. 1.

The aforementioned pen carrier drive pulley 24 in turn is electrically connected by way of a conductor 28 to a second electrically conductive drive pulley 30, that in turn is mounted on the pen carrier 32 shown in FIGS. 1 and 3.

The electrically conductive drive pulley 30 in FIG. 1 in turn is constructed to transmit current passing through the conductive pulley 28 30 through its outer ball bearing race portion 34, that is lubricated by a commercially available electrically conductive grease, to its inner ball bearing race portion 36. The inner race portion 36 of the drive pulley 30 in turn is electrically connected by means of a J-shaped conductive lug 40 to one end 42 of a conductive coil of wire forming the solenoid 44. This electrically conductive drive pulley 30 is threadedly connected at 46 to the pen carrier 32.

The solenoid 44 is grounded by means of a conductive cable 48 and a suitable electrically conductive lug connection (not shown) that is connected thereto, which lug connection is similar to the previously described lug connection 40 that connects the solenoid 44 to the electrically conducted pulley 30. This cable 48 and its associated lug connection are in turn electrically connected by way of the electrically conductive pulley 50 and its associated electrically conductive cable 52 to a ground connection 54. It should be noted that the electrically conductive type of bearing that is employed for the pulley 30 and 50 is preferably of the type disclosed in detail in the W. G. Willing U.S. Pat. No. 3,271,723, issued Sept. 6, 1966.

From the aforementioned description it can thus be seen in FIG. 3 that as the current carrying drive cable 28 is moved toward one side of the chart 26 in the direction of the arrow 56 by means of a conventional reeling means, not shown, that is mounted at the side of this chart 26. The other electrically conductive pulley 50 will also be moved in the same direction along with the pen carrier 32.

It should also be understood that the pulleys 30 and 50 and the pen carrier 32 will be moved in the direction of the arrow 58 to an opposite side of the chart 26 when the aforementioned reeling means, not shown, is actuated in an opposite direction from that which was previously described.

MODE OF OPERATION

Furthermore, while the pen carrier 32 is moving across the chart in either of the aforementioned directions an operator can energize the solenoid 44 by moving the switch 18 FIG. 4 from its solid line, open position to its closed dash line position. When this occurs the core 60 of the solenoid 44 will be moved from a position in which its right end is engaged by the inner wall of the cap portion 62 of the pen carrier 32 as shown in solid line form in FIG. 2 and the dash line form in FIG. 1, to the solid line position shown for the solenoid core 60 in FIG. 1.

As the aforementioned action takes place a disc 64 and an actuator shaft 66 to which the disc is attached, will be moved as a unit in a right to left direction against a compression spring 68, that is positioned within the confines of a cylindrical apertured wall or recess 70 formed in the pen carrier, 32 and this will cause the spring 66 to be compressed against the inner surface of the wall 72.

As the aforementioned movement takes place the left end of the actuator shaft 66, extends through the apertured wall portion 76, in plate 78 which forms a bent out top an back wall portion of a pen holder 80, will be moved to the left of the plate 78 and into the position shown in FIG. 1.

This pen holder 80 is formed out of a single plate and is comprised of top and bottom resilient plate portions 82, 84 and side portions 86, 88 which terminate in looped end portions 90, 92. These looped end portions 90, 92 are shown in FIG. 3 in spring biased engagement with triangular side portions 94, 96 formed on a unitary disposable ink cartridge 98 as well as a flat side portion of the cartridge 98 that is adjacent to each of these triangular portions.

The disposable ink cartridge 98 also includes a pen unit 100 protruding therefrom. As is best shown in FIGS. 1 and 2 the top and bottom portions 82, 84 of this pen holder 80 are also shown in supporting spring biased engagement with the ink cartridge 98.

The type of cartridge 98 and pen unit 100 disclosed herein is the same as that disclosed in the William R. Dahl U.S. Pat. application Ser. No. 180,403.

The pen holder 80 as shown in FIG. 3 is supported for pivotal movement about a pair of pivot pins 102, 104 which extend into and which are attached by cement to walls forming associated cylindrical holes 106, 108 in the pen carrier 32.

FIG. 1 shows a leaf spring 110 having its base portion 112 fixed by a cement material to a bottom surface of the pen carrier 32 and having a vertical portion 114 extending upwardly and outwardly a spring force to the wall portion 78 of the pen holder 80.

It can thus be seen from the aforementioned description that when switch 18 is closed, the solenoid 44 will be energized and the solenoid core 60, the actuator shaft 66 and the disc 116, that is fixably connected to the end of the shaft 66, will be forced in a right to left direction between the position shown in FIG. 2 and the position shown in solid line form in FIG. 1.

While the aforementioned action takes place the spring force being applied in the left to right direction to the disc and disc 64 and to the shaft shaft 66 by the compression spring 68 will be overcome by the stronger force of the solenoid 44 that is moving the core 60 and its associated 66, 64 in a right to left direction.

As the disc 116 is moved from its position shown in FIG. 2 toward its position as shown in FIG. 1 the force of the vertical portion 114 of the spring 110 will be the sole force that is allowed to apply its stored spring force against the bent plate 78 of the pen holder 80 to thereby effect the tilting of the pen holder 80 in a counterclockwise direction about pivot pins 102, 104.

The aforementioned spring biasing action of spring 110 will continue to tilt the pen holder 80 in a counterclockwise direction about the pivot pin 102, 104 until the fiber tipped pen 100 is gently, but rapidly brought into engagement with the chart 26 as shown in solid line form in FIG. 1.

When the switch 18 is thereafter moved to an open position the solenoid 44 will be de-energized and the force of the compression spring 68 which is stronger than the force being applied by the leaf spring 110, will force the disc 64 and the shaft 66, to which this disc 64 is attached, to move in a left to right direction and into its solid line position as shown in FIG. 2.

While this action takes place the movement of the disc 64 to the right will cause the plate 78 and the remaining portion of the pen-holder 80 to be pivoted in a clockwise direction about the pivot pins 102, 104 until it reaches the pen lifted position shown on FIG. 2.

As is best shown in FIG. 1 a passageway 118 is formed in the pen carrier 32 so that this carrier can be mounted on a support guide rail 120 FIGS. 1 and 4 that extends across the chart 26 from one side of this chart to the other.

It can also be seen from the aforementioned description that the unique achievement that is accomplished by mounting the pen lift solenoid 44 within a recess in the pen carrier 32 and by using the aforementioned unique linkage and spring construction 64, 66, 116, 110 and 114 is that the mass of the solenoid plunger is un-coupled from the pen point 100.

By divorcing the weight of the solenoid plunger 60 from that of the pen 100 while going from a pen lifted non recording position, as shown in FIG. 2, to the recording position, as shown in FIG. 1, a higher speed pen lifting-pen and lowering a chart can be achieved over other well known conventional type recorders in which the actuating solenoid parts and associated pen supporting parts are required to be lowered and raised from a chart as a single unit.

The invention thus uniquely links a pen or stylus and a solenoid to eliminate the undesired inertial effects that the mass of a moving core of a solenoid has heretofore applied to the pen or stylus during selective movement of the last mentioned part into and out of contact with a chart.

Since the solenoid 44 is positioned within a recess of the pen carrier 32 it has the advantage of considerably reducing the number and mass of the moving parts that are required in its pen actuating linkage over those required by conventional recorders which have solenoid operated pen actuating devices that are mounted external to their pen carrier.

The embodiments of the invention in which an exclusive property or privilege is claimed are defined as follows:

1. A recording apparatus, comprising a pen and a pen carrier supported for movement over a chart,
   a solenoid positioned within said carrier and having an actuating member connected thereto to effect the movement of a pen onto said chart,
   an electrically conductive pulley means mounted on said pen carrier electrically connected to said solenoid,
   an electrical power source, and
   an electrically conductive drive cable operably connected with said pulley means to move said pen carrier over said chart and to transmit electrical current from said power source by way of said pulley means and its electrical connection to said solenoid, and
   wherein the pen is retained in a pen holder that in turn is mounted for pivotal clockwise and counterclockwise movement about said pen carrier and wherein said pen holder has a cut out wall portion extending away from one of its walls in a cantilever fashion and having its free end portion extending about a portion of said actuating member that in turn is connected for movement with the core of said solenoid, a disc positioned on the outer most end of said actuating member, a first spring means extending in spring biased engagement between said pen carrier and said cut out pen holder wall portion to apply a spring force thereto to rotate said holder and its associated pen in a counterclockwise direction about said pen carrier when said core of said solenoid is in a first one of its two positions to effect rapid movement of the pen into engagement with said chart and a second spring biasing means exerting a greater force than the spring force exerted by said first spring biasing means operably connected to apply a force to said actuating member to bring its associated disc into moving contact with said first biasing spring means to thereby effect movement of said pen holder and its associated pen in a clockwise direction about pen carrier and out of contact with said chart when said core of said solenoid is moved to a second one of its said two positions.

2. A recording apparatus, comprising a pen and a pen carrier supported for movement over a chart,
   a solenoid positioned within said carrier and having an acuating member connected thereto to effect the movement of a pen onto said chart,
   an electrically conductive pulley means mounted on said pen carrier electrically connected to said solenoid,
   an electrical power source, and
   an electrically conductive drive cable operably connected with said pulley means to move said pen carrier over said chart and to transmit electrical current from said power source by way of said pulley means and its electrical connection to said solenoid, and
   wherein the pen is retained in a pen holder that in turn is mounted for pivotal clockwise and counterclockwise movement about said pen carrier and wherein said pen holder has a cut out wall portion extending away from one of its walls in a cantilever fashion and having its free end portion extending about a portion of said actuating member that in turn is connected for movement with the core of said solenoid, a disc positioned on the outer most end of said actuating member, a first spring means extending in spring biased engagement between said pen carrier and said cut out pen holder wall portion to apply a spring force thereto to rotate said holder and its associated pen in a counterclockwise direction about said pen carrier when said core of said solenoid is in an energized position to effect rapid movement of the pen into engagement with said chart, and a second spring biasing means exerting a greater force than the spring force exerted by said first spring biasing means operably connected to apply a force to said actuating member to bring its said associated disc into moving contact with said first biasing spring means to thereby effect movement of said pen holder and its associated pen in a clockwise direction about said pen carrier and out of contact with said chart when said core of said solenoid is moved to a de-energized position.

* * * * *